(12) United States Patent
Iio et al.

(10) Patent No.: US 8,583,194 B2
(45) Date of Patent: Nov. 12, 2013

(54) ELECTRONIC APPARATUS

(75) Inventors: Taro Iio, Yokohama (JP); Takuya Suekane, Yokohama (JP)

(73) Assignee: Kyocera Corporation, Kyoto (JP)

( * ) Notice: Subject to any disclaimer, the term of this patent is extended or adjusted under 35 U.S.C. 154(b) by 832 days.

(21) Appl. No.: 12/441,332

(22) PCT Filed: Sep. 14, 2007

(86) PCT No.: PCT/JP2007/067974
§ 371 (c)(1),
(2), (4) Date: Nov. 30, 2009

(87) PCT Pub. No.: WO2008/032832
PCT Pub. Date: Mar. 20, 2008

(65) Prior Publication Data
US 2010/0069129 A1    Mar. 18, 2010

(30) Foreign Application Priority Data

Sep. 15, 2006  (JP) ................................. 2006-250616

(51) Int. Cl.
*H04M 1/00*    (2006.01)
(52) U.S. Cl.
USPC .................................... 455/575.3; 455/575.1
(58) Field of Classification Search
USPC ...................................................... 455/575.3
See application file for complete search history.

(56) References Cited

U.S. PATENT DOCUMENTS

| | | | | |
|---|---|---|---|---|
| 3,579,105 A | * | 5/1971 | Scott | 324/99 D |
| 3,680,084 A | * | 7/1972 | Franklin et al. | 340/815.47 |
| 4,134,217 A | * | 1/1979 | Neilson | 434/242 |
| 4,541,806 A | * | 9/1985 | Zimmerman et al. | 434/258 |
| 4,695,905 A | * | 9/1987 | Utsugi | 386/358 |
| 4,786,982 A | * | 11/1988 | Wakahara et al. | 386/200 |
| 5,345,775 A | * | 9/1994 | Ridenour | 62/140 |
| 5,473,685 A | * | 12/1995 | Mulder | 379/394 |
| 5,488,404 A | * | 1/1996 | Fleck et al. | 347/238 |
| 5,537,472 A | * | 7/1996 | Estevez-Alcolado et al. | 379/433.02 |
| 5,572,223 A | * | 11/1996 | Phillips et al. | 343/702 |
| 5,623,226 A | * | 4/1997 | Whitmarsh et al. | 330/2 |
| 5,673,314 A | * | 9/1997 | Olkoski et al. | 379/433.13 |
| 5,936,613 A | * | 8/1999 | Jaeger et al. | 345/172 |
| 6,075,454 A | * | 6/2000 | Yamasaki | 340/5.61 |

(Continued)

FOREIGN PATENT DOCUMENTS

| | | |
|---|---|---|
| JP | 2001-175356 | 6/2001 |
| JP | 2003-280792 | 10/2003 |

(Continued)

*Primary Examiner* — Hai V Nguyen
(74) *Attorney, Agent, or Firm* — DLA Piper LLP (US)

(57) ABSTRACT

A touch sensor becomes an operation enable state in which an operation state can be detected, when predetermined voltage is applied. A touch sensor control unit switches the touch sensor to an operation detection enable state by raising the voltage to a predetermined voltage level gradually and performing predetermined calibration when detecting an activation permission request of the touch sensor in a no-voltage applied state of the touch sensor, and switches the touch sensor to an operation detection disable state in which an operation state of the touch sensor cannot be detected by lowering voltage gradually to the no-voltage applied state. And, when detecting the activation permission request of the touch sensor during switching to the operation detection disable state, the touch sensor control unit switches the touch sensor to the operation detection enable state, after the switching operation to the operation detection disable state is completed.

8 Claims, 10 Drawing Sheets

(56) References Cited

U.S. PATENT DOCUMENTS

| | | | |
|---|---|---|---|
| 6,091,938 A * | 7/2000 | Go | 455/575.3 |
| 6,178,388 B1 * | 1/2001 | Claxton | 702/107 |
| 6,233,406 B1 * | 5/2001 | Iwamoto | 396/284 |
| 6,266,098 B1 * | 7/2001 | Cove et al. | 348/563 |
| 6,282,409 B1 * | 8/2001 | Frohlund | 455/575.3 |
| 6,462,683 B2 | 10/2002 | Draxelmayr | 341/118 |
| 6,489,883 B1 * | 12/2002 | Iiyama et al. | 340/5.1 |
| 6,552,653 B2 * | 4/2003 | Nakaho et al. | 340/425.5 |
| 6,563,864 B1 * | 5/2003 | Ibrahim et al. | 375/222 |
| 6,664,782 B2 * | 12/2003 | Slates | 324/207.16 |
| 6,723,937 B2 * | 4/2004 | Englemann et al. | 200/600 |
| 6,744,470 B1 * | 6/2004 | Kalshoven et al. | 348/370 |
| 6,781,570 B1 * | 8/2004 | Arrigo et al. | 345/158 |
| 6,967,581 B2 * | 11/2005 | Karsten | 340/576 |
| 7,009,182 B2 * | 3/2006 | Kannan et al. | 250/370.07 |
| 7,028,410 B2 * | 4/2006 | Sato et al. | 33/356 |
| 7,063,546 B2 * | 6/2006 | Akino | 439/620.21 |
| 7,312,732 B2 * | 12/2007 | Engl | 341/118 |
| 7,466,307 B2 * | 12/2008 | Trent et al. | 345/173 |
| 7,477,882 B2 * | 1/2009 | Shimizu et al. | 455/244.1 |
| 7,502,016 B2 | 3/2009 | Trent et al. | 345/173 |
| 7,518,381 B2 * | 4/2009 | Lamborghini et al. | 324/679 |
| 7,519,350 B2 * | 4/2009 | Yamamoto et al. | 455/347 |
| 7,609,253 B2 | 10/2009 | Trent et al. | 345/173 |
| 7,657,287 B2 * | 2/2010 | Hausner et al. | 455/558 |
| 7,683,890 B2 * | 3/2010 | Geaghan | 345/173 |
| 7,705,834 B2 * | 4/2010 | Swedin | 345/174 |
| 7,705,838 B2 * | 4/2010 | Kinerk et al. | 345/184 |
| 7,710,393 B2 * | 5/2010 | Tsuk et al. | 345/156 |
| 7,710,394 B2 * | 5/2010 | Robbin et al. | 345/156 |
| 7,801,117 B2 * | 9/2010 | Berman | 370/355 |
| 8,078,232 B2 * | 12/2011 | Higashiyama et al. | 455/566 |
| 8,081,943 B2 * | 12/2011 | Shimizu et al. | 455/244.1 |
| 8,179,293 B2 * | 5/2012 | Chen | 341/120 |
| 8,270,397 B2 * | 9/2012 | Berman | 370/355 |
| 8,274,489 B2 * | 9/2012 | Chuang et al. | 345/173 |
| 8,324,910 B2 * | 12/2012 | Lamborghini et al. | 324/658 |
| 8,335,938 B2 * | 12/2012 | Orr et al. | 713/320 |
| 2003/0001816 A1 * | 1/2003 | Badarneh | 345/156 |
| 2003/0111588 A1 * | 6/2003 | Chen | 250/208.1 |
| 2003/0184459 A1 * | 10/2003 | Engl | 341/120 |
| 2004/0135680 A1 * | 7/2004 | Jacobs | 340/426.12 |
| 2004/0196257 A1 | 10/2004 | Sato et al. | 345/156 |
| 2004/0204129 A1 * | 10/2004 | Payne et al. | 455/566 |
| 2004/0252109 A1 | 12/2004 | Trent et al. | 245/174 |
| 2005/0143148 A1 * | 6/2005 | Sato et al. | 455/575.1 |
| 2005/0156881 A1 | 7/2005 | Trent et al. | 345/157 |
| 2005/0176470 A1 * | 8/2005 | Yamakawa | 455/566 |
| 2006/0161711 A1 * | 7/2006 | Inoue | 710/301 |
| 2006/0166060 A1 * | 7/2006 | Miura | 429/25 |
| 2006/0177212 A1 * | 8/2006 | Lamborghini et al. | 396/287 |
| 2006/0187216 A1 | 8/2006 | Trent et al. | 345/173 |
| 2006/0244732 A1 * | 11/2006 | Geaghan | 345/173 |
| 2006/0279548 A1 * | 12/2006 | Geaghan | 345/173 |
| 2007/0018790 A1 * | 1/2007 | LaFrance | 340/5.72 |
| 2007/0109161 A1 * | 5/2007 | Shimizu et al. | 341/120 |
| 2008/0004113 A1 * | 1/2008 | Avery et al. | 463/37 |
| 2008/0041642 A1 | 2/2008 | Trent et al. | 178/18.06 |
| 2008/0042976 A1 | 2/2008 | Trent et al. | 345/157 |
| 2008/0045278 A1 * | 2/2008 | Kim | 455/575.1 |
| 2008/0048978 A1 | 2/2008 | Trent et al. | 345/174 |
| 2009/0080571 A1 * | 3/2009 | Shimizu et al. | 375/319 |
| 2009/0316571 A1 * | 12/2009 | Rose | 370/218 |
| 2010/0164871 A1 * | 7/2010 | Shigeta et al. | 345/169 |
| 2010/0245231 A1 * | 9/2010 | Aramaki | 345/156 |
| 2010/0253641 A1 * | 10/2010 | Swedin | 345/173 |
| 2012/0013569 A1 * | 1/2012 | Swedin | 345/174 |
| 2012/0109482 A1 * | 5/2012 | Yoshii | 701/70 |

FOREIGN PATENT DOCUMENTS

| | | |
|---|---|---|
| JP | 2004-246414 | 9/2004 |
| JP | 2004-311196 | 11/2004 |
| JP | 2005-175653 | 6/2005 |
| JP | 2005-522797 A | 7/2005 |
| JP | 2005-277466 | 10/2005 |
| WO | WO 03/088176 A1 | 10/2003 |

* cited by examiner

FIG. 4
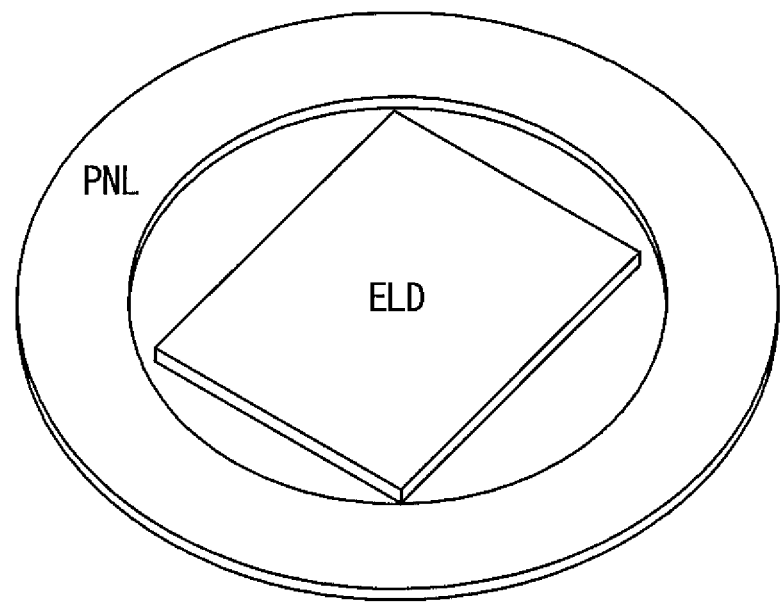
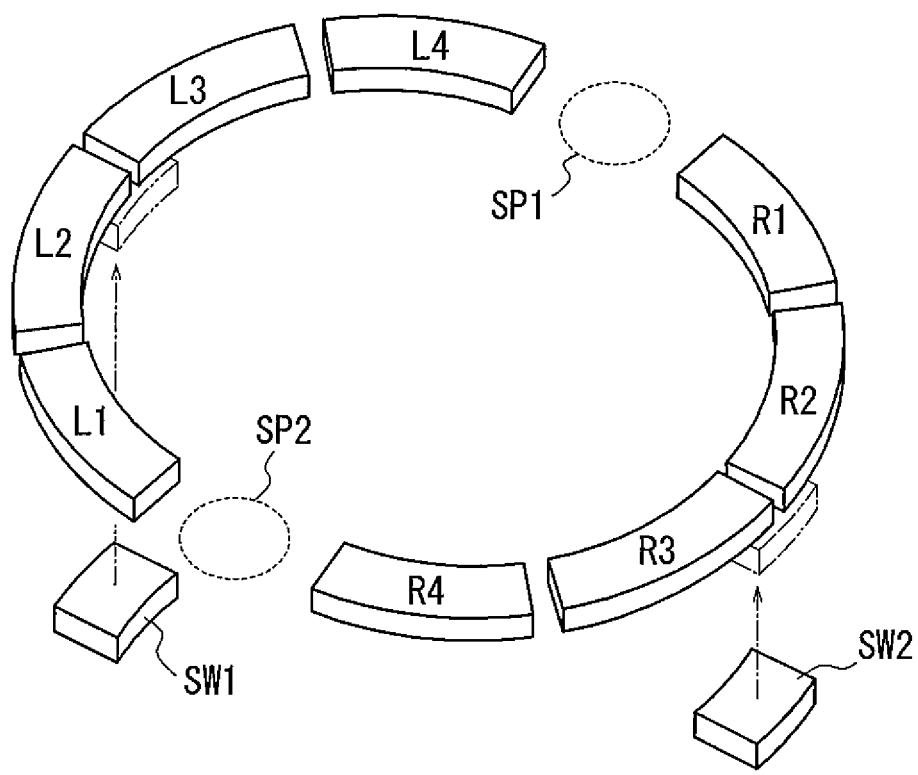

FIG. 6
(a)
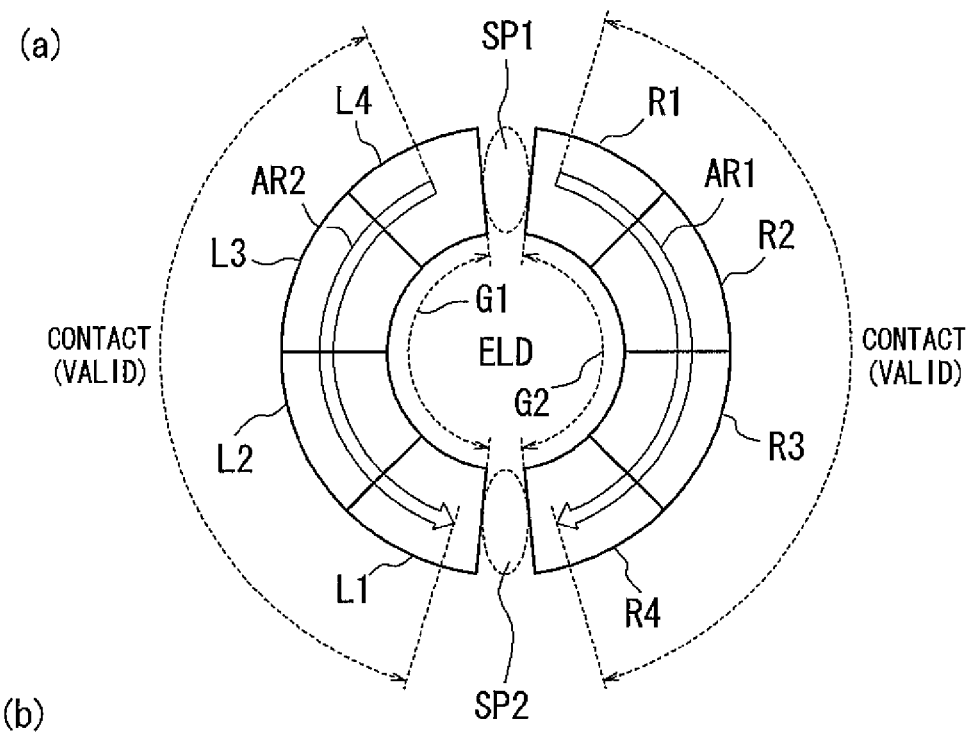
(b)
IN THE CASE OF AR1
| R1 DETECT | R2 DETECT | R3 DETECT | R4 DETECT |
← — — — — — CONTACT (VALID) — — — — — → TIME
IN THE CASE OF AR2
| L4 DETECT | L3 DETECT | L2 DETECT | L1 DETECT |
← — — — — — CONTACT (VALID) — — — — — → TIME
(c)
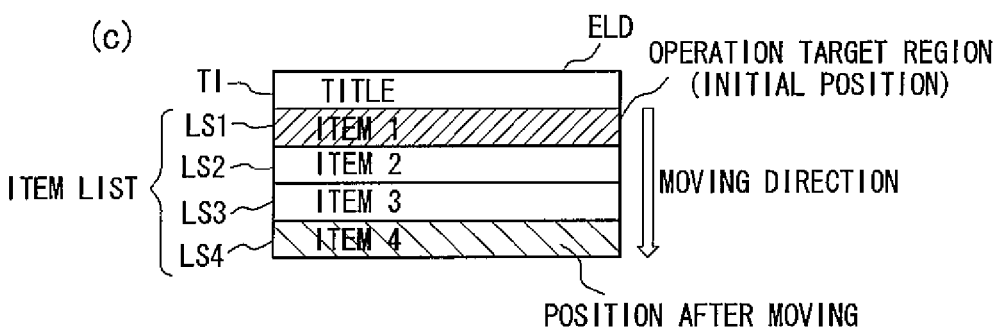

ELECTRONIC APPARATUS

CROSS REFERENCE TO RELATED APPLICATION

This application is a national stage of international application No. PCT/JP2007/067974 filed on Sept. 14, 2007, which also claims priority to and the benefit of Japanese Patent Application No. 2006-250616 filed Sept. 15, 2006, the entire content of which are incorporated herein by reference.

TECHNICAL FIELD

The present invention relates to an electronic apparatus, and more particularly, to an electronic apparatus having an operation detection unit for detecting an operation.

BACKGROUND ART

Various interfaces and designs have been developed as operation detection units of electronic apparatus. For example, there is a technique which provides a rotary dial input device to an electronic apparatus and moves a cursor displayed on a display unit according to the rotation amount of the rotary dial input device (refer to Patent Document 1). However, since the conventional technique employs the "rotary dial" rotated physically and mechanically, there are troubles or errors caused by a mechanical abrasion. Therefore, maintenance of the operation detection unit is needed, and the durable period is short.

Therefore, techniques employing a touch sensor as an operation detection unit which is not operated by physical and mechanical rotations have been proposed (refer to Patent Documents 2 and 3). The proposed techniques arrange a plurality of touch sensors continuously, detect an operation involving movement based on contact detection by each of touch sensor elements, and perform a selection operation control for selecting one among a plurality of selection items.

Patent Document 1: Japanese Patent Laid-Open No. 2003-280792
Patent Document 2: Japanese Patent Laid-Open No. 2005-522797
Patent Document 3: Japanese Patent Laid-Open No. 2004-311196

DISCLOSURE OF THE INVENTION

Problems to be Solved by the Invention

The conventional electronic apparatus having the operation detection unit is designed to be set to either an operation enable state or an operation disable state. In addition, when there is a predetermined request in the operation disable state, the operation detection unit is set to the operation enable state and calibration is performed according to the request, so that the electronic apparatus becomes a state in which an operation to an operation unit can be detected. However, when the predetermined request is performed during setting the operation detection unit to the operation disable state from the operation enable state or during setting it to the operation enable state from the operation disable state, the setting to the operation enable state and the calibration are started upon the request. Therefore, the operation detection unit is set to the operation enable state without a proper calibration being completed. In other words, in this case, the operation detection unit cannot detect an operation to the operation unit correctly.

In the view of the above problem, it is an advantage of the present invention to provide an electronic apparatus having an operation detection unit capable of detecting an operation to an operation unit correctly even in case that there is a predetermined request during setting to an operation disable state from an operation enable state or during setting to the operation enable state from the operation disable state.

SUMMARY OF THE INVENTION

To solve the problem, an electronic apparatus according to the present invention includes: an operation unit; an operation detection unit capable of detecting an operation to the operation unit and capable of being set to either an operation enable state or an operation disable state; a calibration unit for performing calibration on the operation detection unit; and a control unit for setting the operation detection unit to the operation enable state and controlling the calibration unit to perform calibration on the operation detection unit according to a first request, wherein the operation detection unit can detect an operation to the operation unit when the setting to the operation enable state by the control unit and the calibration by the calibration unit are performed according to the first request in the operation disable state, and the control unit suppresses the setting to the operation enable state of the operation detection unit and the calibration by the calibration unit according to the first request performed during setting the operation detection unit to the operation disable state from the operation enable state.

Moreover, an electronic apparatus according to the present invention includes: an operation unit; an operation detection unit capable of detecting an operation to the operation unit and capable of being set to either an operation enable state or an operation disable state; a calibration unit for performing calibration on the operation detection unit; and a control unit for setting the operation detection unit to the operation enable state and controlling the calibration unit to perform calibration on the operation detection unit according to a first request, wherein the operation detection unit can detect an operation to the operation unit when the setting to the operation enable state by the control unit and the calibration by the calibration unit are performed according to the first request in the operation disable state, and the control unit suppresses the setting to the operation enable state of the operation detection unit and the calibration by the calibration unit according to the first request performed during setting the operation detection unit to the operation enable state from the operation disable state.

The control unit preferably sets the operation detection unit to the operation enable state and controls the calibration unit to perform calibration according to the first request performed during setting the operation detection unit to the operation disable state from the operation enable state, after the operation detection unit is set to the operation disable sate.

Moreover, the electronic apparatus according to the present invention further includes: a first housing; a second housing; a connection unit for connecting the first housing and the second housing in an openable and closable manner; and an open/closed detection unit for detecting an open/closed state of the first housing and the second housing through the connection unit, and the control unit preferably recognizes a detection result of the open/closed state of the first housing and the second housing detected by the open/closed detection unit as the first request, and then sets the operation detection unit to the operation enable state and controls the calibration unit to perform calibration on the operation detection unit.

Moreover, the electronic apparatus according to the present invention further includes a storage unit for storing that the first request or a second request is performed during setting the operation detection unit to the operation disable state from the operation enable state, and the control unit preferably sets the operation detection unit to the operation disable state according to the second request, sets the operation detection unit to the operation enable state and controls the calibration unit to perform calibration according to the first request when a request lastly stored in the storage unit during setting the operation detection unit to the operation disable state from the operation enable state is the first request, and sets the operation detection unit to the operation disable state when the request lastly stored in the storage unit during the setting is the second request.

Moreover, the electronic apparatus according to the present invention further includes: a first housing; a second housing; a connection unit for connecting the first housing and the second housing in an openable and closable manner; and an open/closed detection unit for detecting an open/closed state of the first housing and the second housing through the connection unit, and the control unit preferably recognizes a detection result of either one of open and closed states of the first housing and the second housing detected by the open/closed detection unit as the first request, and preferably recognizes a detection result of the other state as the second request.

Furthermore, the control unit preferably switches the operation detection unit to the operation disable state when there is a second request during setting the operation detection unit to the operation enable state from the operation disable state.

According to a control method for an electronic apparatus of the present invention, the electronic apparatus has an operation detection unit capable of detecting an operation to an operation unit and capable of being set to either an operation enable state or an operation disable state, and detecting an operation to the operation unit when a setting to the operation enable state and a calibration are performed according to a first request performed in the operation disable state, and the control method suppresses the setting to the operation enable state of the operation detection unit and the calibration according to the first request performed during the operation detection unit is being switched between the operation enable state and the operation disable state.

EFFECT OF THE INVENTION

According to the present invention, the electronic apparatus can detect an operation to an operation unit correctly since it is possible to suppress setting to an operation enable state of an operation detection unit and calibration according to a predetermined request even in case that there is the request when the operation detection unit is being set to an operation disable state from an operation enable state or when it is being set to the operation enable state from the operation disable state.

BRIEF DESCRIPTION OF DRAWINGS

FIG. 4 is an exploded perspective view of elements of the cellular phone terminal shown in FIG. 3;

FIG. 6 shows a response of the sub-display unit when a user traces sensor elements;

DESCRIPTION OF EMBODIMENTS

Figure 1:
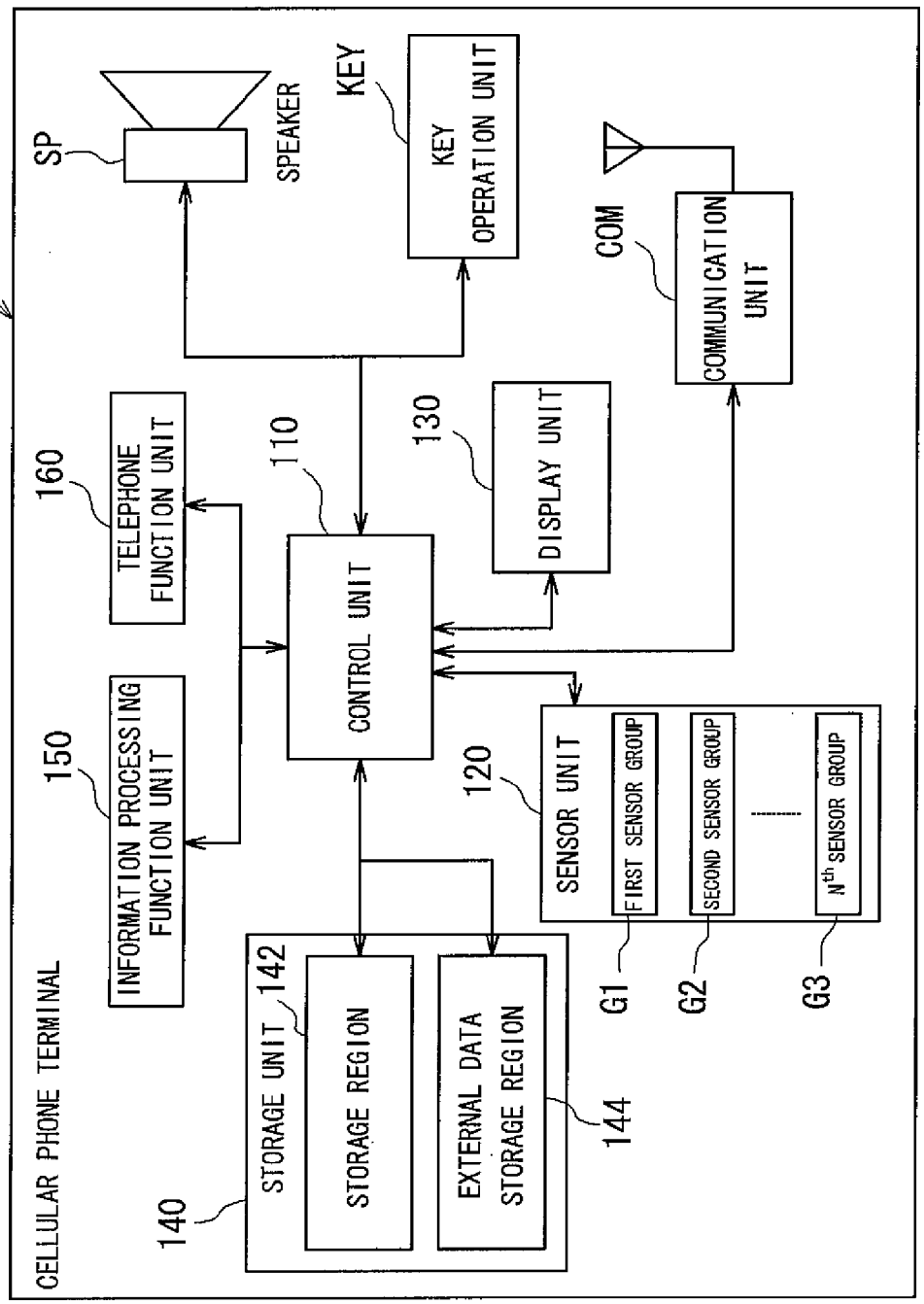
FIG. 1 is a block diagram illustrating a basic design of a cellular phone terminal according to the present invention.

Preferred embodiments of the present invention will now be described with reference to the accompanying drawings. In the following description, the present invention is applied to a cellular phone terminal as a typical example of an electronic apparatus. FIG. 1 is a block diagram illustrating a basic design of a cellular phone terminal according to the present invention. As shown in FIG. 1, the cellular phone terminal 100 includes a control unit 110, a sensor unit 120, a display unit 130, a storage unit (flash memory or the like) 140, an information processing function unit 150, a telephone function unit 160, a key operation unit KEY, a speaker SP and a communication unit COM for performing communication by being connected to CDMA communication network (not shown). The sensor unit 120 includes n sensor element groups as usage, in other words, a first sensor element group G1, a second sensor element group G2, and an $n^{th}$ sensor element group G3, and the sensor element group has a plurality of sensors (for example, contact sensors having detection portions arranged on a surface of a housing for detecting contact or approach of an object such as a finger or the like). The storage unit 140 has a storage region 142 and an external data storage region 144. The control unit 110 and the information processing function unit 150 preferably have calculation means such as CPU, software module and the like. In addition, a serial interface unit SI which will be described later, a FeliCA module FM and an infrared-ray communication unit IR connected to the control unit 110 through the serial interface unit SI, a camera 220, a light 230, a microphone MIC, a radio module RM, a power supply PS, a power supply controller PSCON, etc. are connected to the control unit 110, but they are not shown in the drawing for simplification.

Function of each block in the block diagram shown in FIG. 1 will be briefly described. The control unit 110 detects a contact of an object such as user's finger or the like with the sensor unit 120, stores the detected information into the storage region 142 of the storage unit 140, and controls the information processing function unit 150 to process the stored information. The control unit 110 displays information according to a processing result on the display unit 130. The control unit 110 also controls the telephone function unit 160 for ordinary call function, the key operation unit KEY, and the speaker SP. The display unit 130 is configured by including a sub-display unit ELD and a main display unit (display unit which is provided at a position where it is hidden in the closed state of the cellular phone terminal 100, and is exposed in the open state) not shown.

Figure 2:
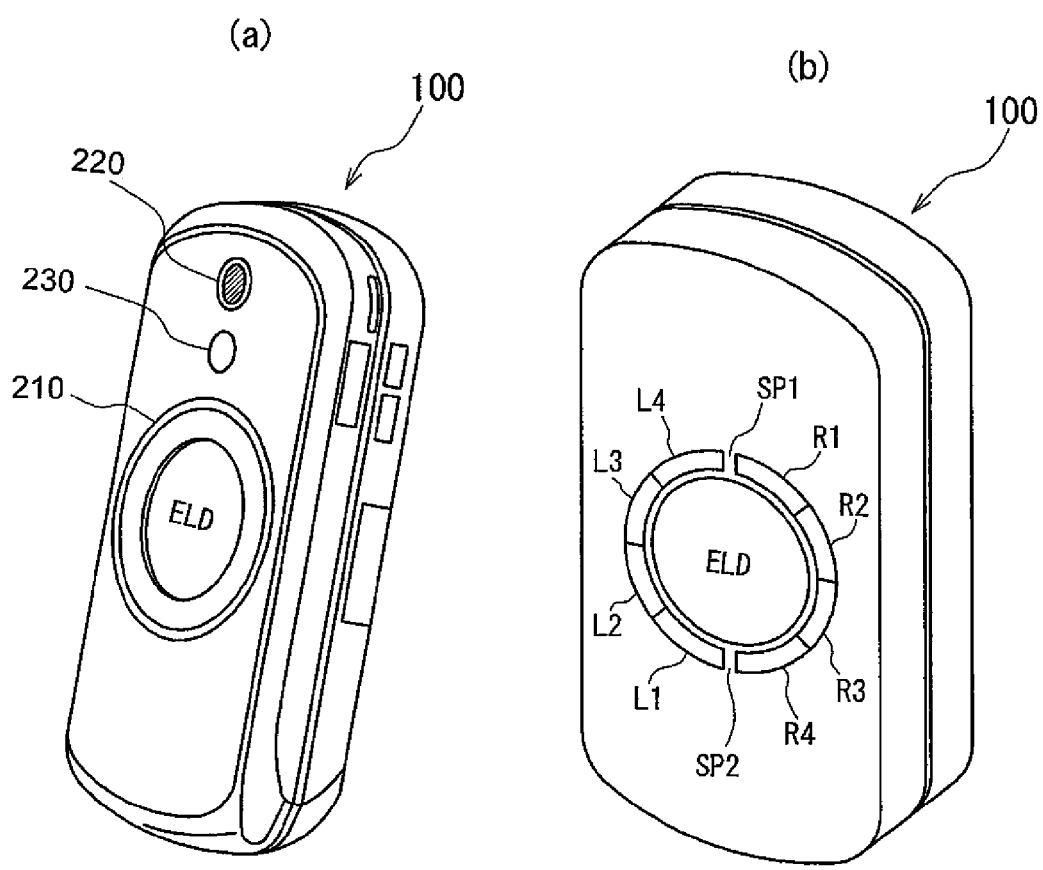
FIG. 2 is a perspective view of the cellular phone terminal having sensor elements mounted on the housing.

FIG. 2 is a perspective view of the cellular phone terminal having sensor elements mounted on the housing. The cellular phone terminal 100 can form an open state by rotating a hinge unit or being slid, as well as a closed state as shown in FIG. 2, and a touch sensor unit 210 is provided at a position where it is operable even in the closed state. FIG. 2(a) is a perspective view illustrating an appearance of the cellular phone terminal 100. The cellular phone terminal 100 has the touch sensor unit 210 (in appearance, a panel PNL (an operation unit) that covers the sensor unit 120, in other words, the sensor element groups G1, G2 is seen (it will be described later by referring to FIG. 4)), the camera 220, and the light 230. FIG. 2(b) is a perspective view of the cellular phone terminal 100 illustrating only sensor elements and arrangement around the sub-display unit ELD with omitting the panel PNL for describing an operation of the touch sensor. As shown, sensor elements L1 to L4 and R1 to R4 are arranged around the sub-display unit ELD side by side. Sensor elements L1 to L4 and R1 to R4 compose a first sensor element group G1 and a second sensor element group G2, respectively. The first sensor element group G1 and the second sensor element group G2 are separated by separating portions SP1, SP2 between them. With respect to the layout of the first sensor element group G1, the second sensor element group G2 has a layout of line symmetry with respective to the direction in which the selection candidate items are arranged, with the sub-display unit ELD between them. In this embodiment, an organic EL display is used as the sub-display unit ELD, but for example, a liquid crystal display or the like may be employed. Moreover, in this embodiment, capacitance-type contact sensors are employed as sensor elements.

In the cellular phone terminal 100 of FIG. 2, the sub-display unit ELD displays information according to a usage of the cellular phone terminal 100. For example, when the cellular phone terminal 100 is used as a music player, titles of pieces of music that can be played are displayed on the sub-display unit ELD. A set of a music title and artist name forms one item, in other words, "selection candidate item". When a user changes the capacitance of sensor elements L1 to L4 and R1 to R4 by operating the touch sensor unit 210, the control unit 110 selects a music title by moving items or an operation target region displayed on the sub-display unit ELD. Arranging sensor elements of the touch sensor unit 120 side by side around the sub-display unit ELD as shown in FIG. 2 allows sensor elements to be formed so as not to occupy a large mounting portion on the housing of the small cellular phone terminal as well as allows a user to operate sensor elements with seeing the display on the sub-display unit ELD.

Figure 3:
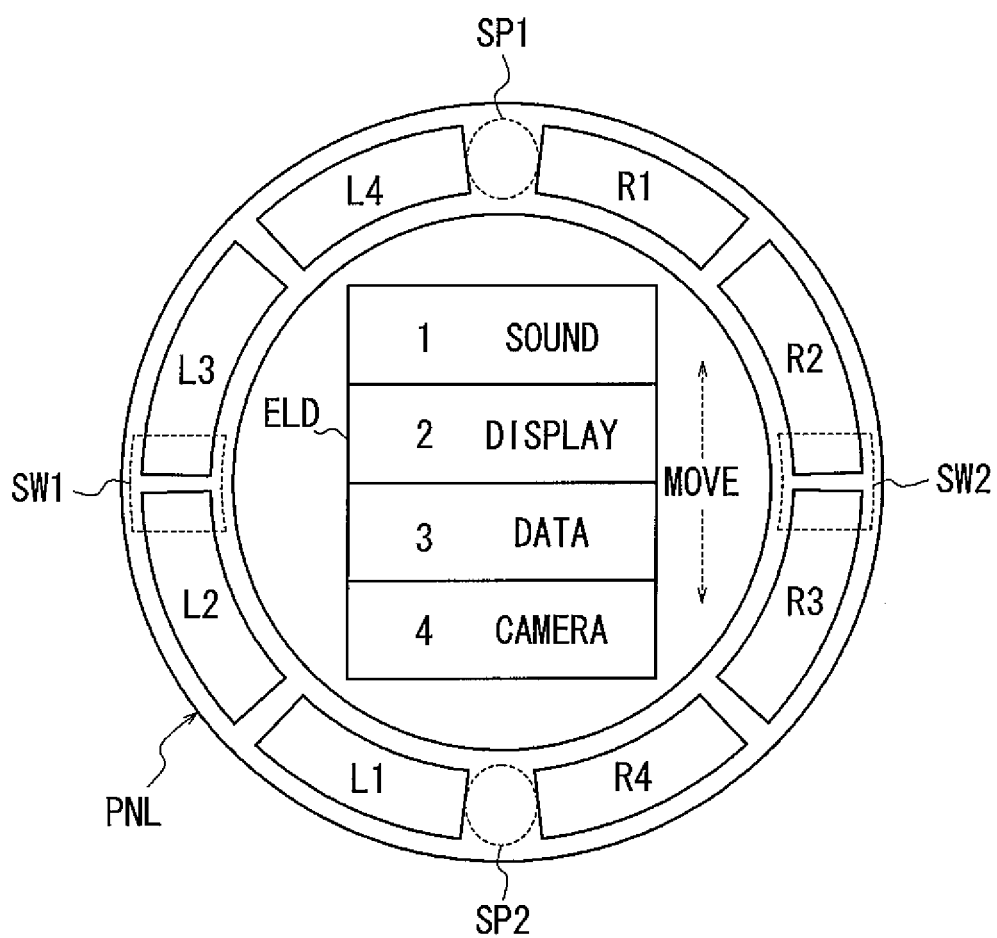
FIG. 3 is a plane view illustrating an arrangement of elements of the cellular phone terminal according to the present invention.

FIG. 3 is a plane view illustrating an arrangement of components especially of the touch sensor unit 210 of the cellular phone terminal 100 according to the present invention. For convenience of creating the drawings and explanation, only some of the components are illustrated and explained. As shown, the panel PNL of an annular shape is placed along the periphery of the sub-display unit ELD composed of the organic EL device. The panel PNL is preferably thin enough not to affect sensitivity of the sensor elements provided under the panel PNL. Eight capacitance-type sensor elements L1 to L4 and R1 to R4 that can detect a contact/approach of a finger are arranged annularly and continuously under the panel PNL. The four sensor elements L1 to L4 at the left side compose the first sensor element group G1, and the four sensor elements R1 to R4 at the right side compose the second sensor element group G2. Between adjacent sensor elements in each sensor element group, a clearance is formed so that a sensor element does not interfere in a contact detection function of an adjacent sensor element. When using non-interfering sensor elements, these clearances are unnecessary. A separating portion SP1, which is a larger clearance than the clearance between adjacent sensor elements in the same sensor element group (for example, twice as long or greater), is formed between the sensor element L4 placed on one end of the first sensor element group G1 and the sensor element R1 placed on one end of the second sensor element group G2. Similarly to the separating portion SP1, a separating portion SP2 is formed between the sensor element L1 placed on the other end of the first sensor element group G1 and the sensor element R4 placed on the other end of the second sensor element group G2. By these separating portions SP1, SP2, it is possible to prevent a finger from interfering in another one, when the first sensor element group G1 and the second sensor element group G2 operate individually.

Sensor elements of the first sensor element group G1 are arranged in a circular arc shape, and the central portion of a tact switch SW1 is arranged under the center of the circular arc, in other words, under the middle of sensor elements L2 and L3. Similarly, the central portion of a tact switch SW2 is arranged on the center of a circular arc formed by sensor elements of the second sensor element group G2, in other words, under the middle of sensor elements R2 and R3 (see FIG. 4). Arranging the tact switches approximately in the center in the arrangement direction of sensor elements, which are positions not associated with directionality, allows a user to easily recognize that tact switches are switches for performing operations not directly related to a direction instruction due to an operation performed by the user on a sensor element which is accompanied by directional movements of a finger. If the tact switch is not arranged on the center in the arrangement direction of sensor element group but arranged on an end portion (for example, L1 or L4), since the tact switch associates the direction toward the end portion, a user may misunderstand the switch as a "switch" to be pressed long to continue a moving operation by the touch sensor or the like. On the contrary, like this embodiment, when the tact switch is arranged on the center in the arrangement direction of the sensor element group, it is possible to prevent a user from having such a misunderstanding, and to provide more comfortable user interface. Moreover, since the tact switch is arranged under the sensor element and not exposed to the surface of the device, it is possible to reduce the number of operation units exposed to the appearance of the apparatus, and therefore, it is possible to make a smart impression that seems not to require complicated operations. Moreover, when the switch is formed in another location except for the lower part of the panel PNL, it is necessary to form a through hole on the housing of the apparatus, which may lead to reduction of strength of the housing according to a location on which the through hole is formed. In this embodiment, the tact switch is arranged under the panel PNL and sensor elements, so that it is not necessary to form a new through hole and it is possible to prevent strength of the housing from being reduced.

When a user traces, for example, upward sensor elements L1, L2, L3, L4 successively in an arc shape with a finger, an item displayed as a selection target region (i.e., emphasized region with reversed display, another color, or the like, which is not shown) among selection candidate items (in this case, sound, display, data, camera) displayed on the display unit ELD is changed to a upper item successively, or selection candidate items are scrolled upward. When a desired selection candidate item is displayed as the selection target region, the user can perform a select decision operation for deciding the selectable item by pushing the tact switch SW1 through the panel PNL and sensor elements L2, L3, or can change a screen display to another one by pushing the tact switch SW2. In other words, the panel PNL has also a function as a pusher to the tact switches SW1, SW2 by being mounted on the housing with sufficient flexibility for pressing down tact switches SW1, SW2, or to be able to tilt slightly.

FIG. 4 is an exploded perspective view of the touch sensor unit 210 especially in components of the cellular phone terminal shown in FIGS. 2 and 3. As shown, the panel PNL and the sub-display unit ELD are disposed on the first layer that forms an outer face of the housing of the device. Sensor elements L1 to L4 and R1 to R4 are arranged on the second layer under the panel PNL of the first layer. Tact switches SW1, SW2 are arranged on the third layers under the region between sensor elements L2, L3 of the second layer and under the region between sensor elements R2, R3, respectively.

Figure 5:
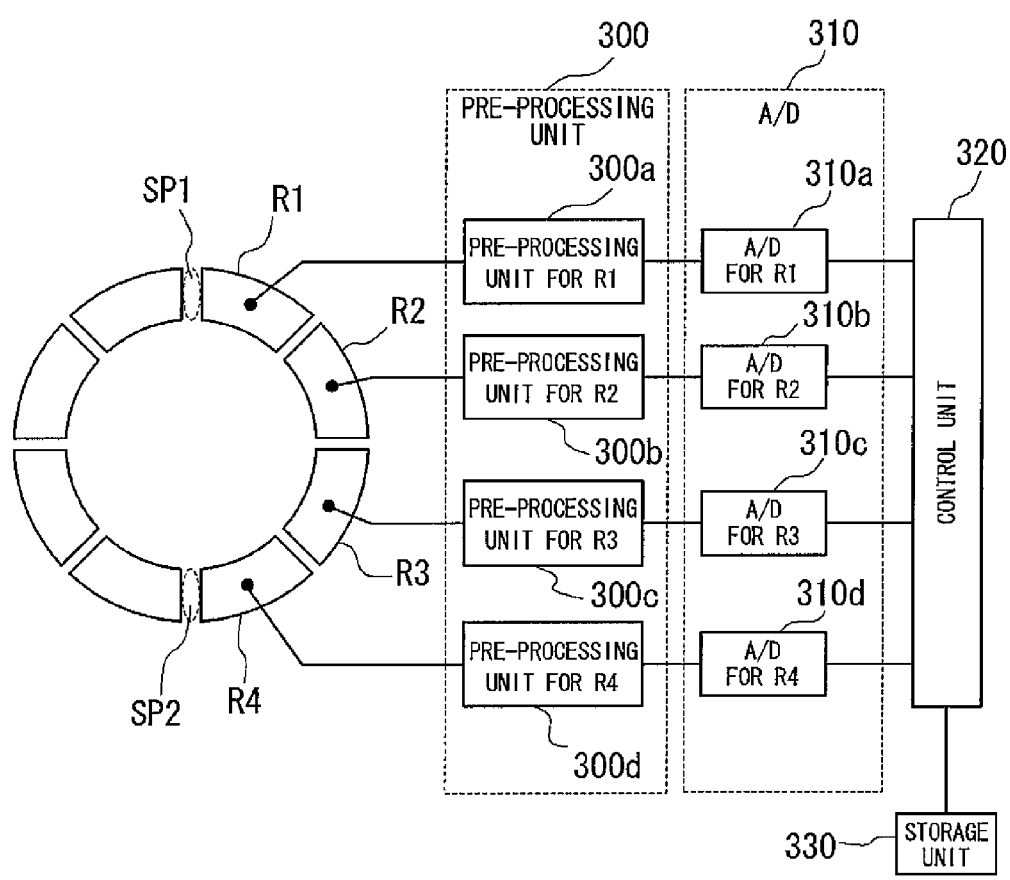
FIG. 5 is a block diagram illustrating a process of contact detection data from each sensor element of the cellular phone terminal according to the present invention.

FIG. 5 is a block diagram illustrating a process of contact detection data from each sensor element in the cellular phone terminal according to the present invention. For convenience of explanation, the process of data from sensor elements R1 to R4 is only illustrated. However, the process is similarly applied to sensor elements L1 to L4. High frequency signals are applied to sensor elements R1 to R4, respectively. Calibration is performed by considering variation on a stray capacitance, and the high frequency condition at this time is set as a reference. When a pre-processing unit 300 (a pre-processing unit for R1 300a, a pre-processing unit for R2 300b, a pre-processing unit for R3 300c and a pre-processing unit for R4 300d) detects variations of the high frequency condition based on changes of capacitance caused by a contact of a finger or the like, the detection signals are sent to an A/D convertor 310 (an A/D convertor for R1 310a, an A/D convertor for R2 310b, an A/D convertor for R3 310c and an A/D convertor for R4 310d), and converted to digital signals indicating contact detection. The digital signals are sent to a control unit 320. The control unit 320 arranges the signals as a signal of the sensor element group, and stores information including the signal into a storage unit 330. And then, the control unit 320 outputs this signal to a serial interface unit SI, an interrupt handler IH which will be described later. The signal is converted to a signal readable by a touch sensor driver TSD by the interrupt handler IH, and then inserted into a queue QUE. Moreover, the control unit 320 detects a direction when two or more adjacent sensor elements detect a contact based on information stored in the storage unit 330.

Figure 7:
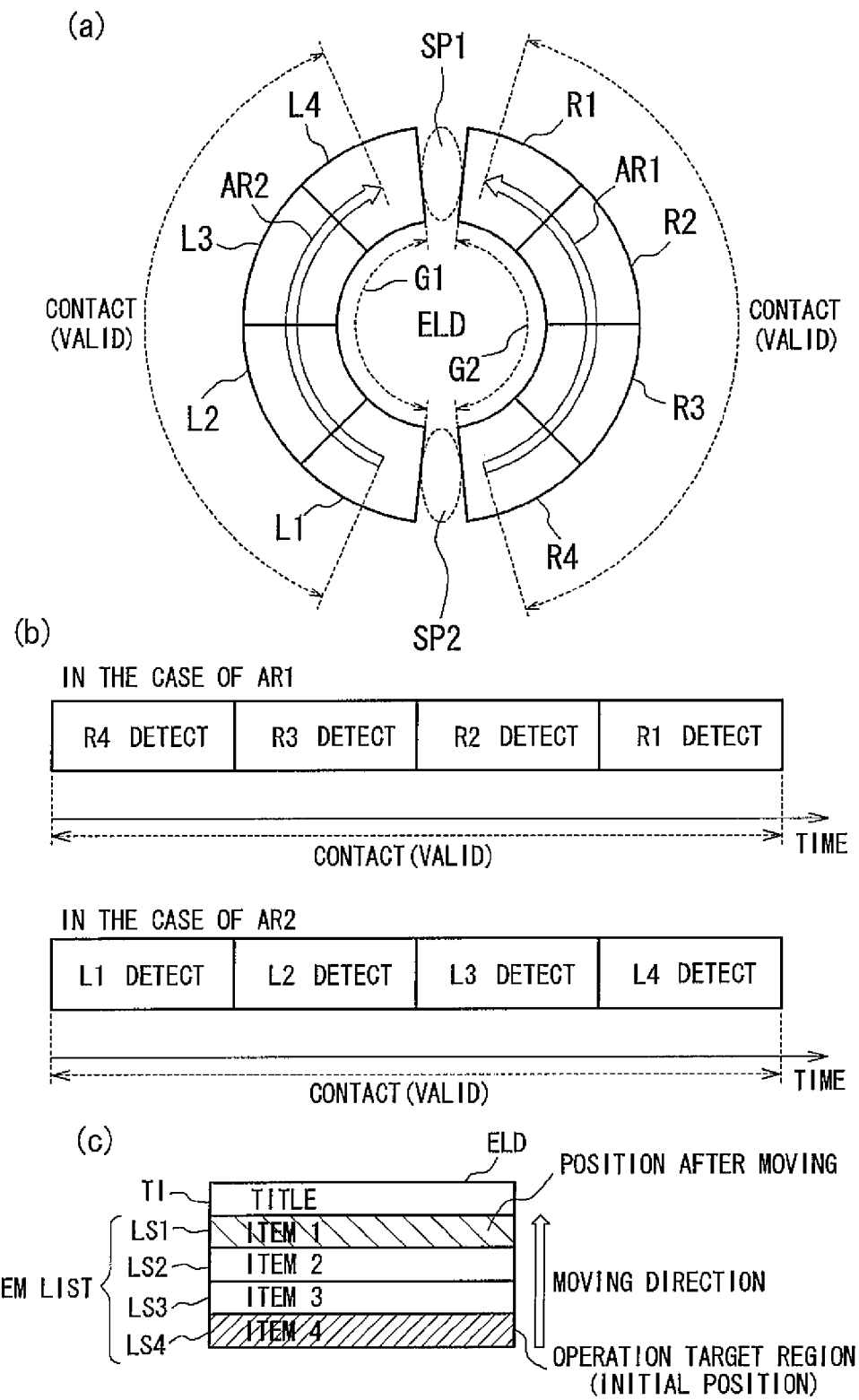
FIG. 7 shows a response of the sub-display unit when a user traces sensor elements.

Below, a response of the sub-display unit when a user traces sensor elements will be described by referring to FIGS. 6 and 7. In FIGS. 6 and 7, (a)s are schematic diagrams illustrating only the sub-display unit ELD mounted on the cellular phone terminal and sensor elements arranged around the sub-display unit ELD for brief explanation; (b)s show temporal transitions of sensor elements which detect a contact; and (c)s show changes of position of the operation target region on the sub-display unit ELD according to sensor elements which detect the contact. In these (a)s, the same referential numeral with those of FIG. 2(b) are used for sensor elements, sensor element groups and separating portions. In display on the sub-display unit ELD of (c)s, TI indicates a title of an item list displayed on the sub-display unit, and LS1 to LS4 indicate selection candidate items (for example, scrollable several lines). On the sub-display unit of (c), an item that is an operation target is emphasized by placing a cursor thereon or inversely displaying the item itself so that the item can be identified as the current operation target region. In drawings, an item indicated as the operation target region is emphasized by being hatched. For convenience of explanation, a "moving target" is explained with only an operation target region, but the sub-display unit also operates with a similar method when the item itself is moved (scrolled).

In FIG. 6(a), when a user traces sensor elements continually with a contact means, for example a finger or the like, from top to bottom as indicated by an arrow AR1, the control unit 110 detects the contact as an operation involving movement with a temporal transition as shown in (b). In this case, sensor elements R1, R2, R3, R4 detect the contact in order. Since the continuous contact from R1 to R4 is detected by two or more adjacent sensor elements, the direction is detected, and the operation target region moves on the list displayed on the sub-display unit ELD according to the number of transition to adjacent sensor elements and the direction. In this case, as shown in (c), the operation target region moves downward by 3 items from the item LS1 of the initial position to the item LS4. The operation target region is shown by being hatched: one hatched with narrow pitches is the initial position; and the other hatched with wide pitches is the position after movement. In this way, according to this embodiment, since "the operation target region moves downward" on the display unit similarly to the "instruction operation of a finger downward" of a user, the user feels as if the operation target region is freely moved by his finger. In other words, it is possible to achieve an operation feeling as intended by a user.

Similarly, when sensor elements are traced in a direction indicated by an arrow AR2 in (a), sensor elements L4, L3, L2, L1 among sensor elements detect the contact in order as an operation involving movement as shown in (b). In this case, since the contact transits three adjacent sensor elements from top to bottom like the arrow AR1, the operation target region moves downward by three items from the item LS1 to the item LS4 as shown in (c).

In FIG. 7(a), when sensor elements are traced upward (counter-clockwise) as indicated by an arrow AR1, sensor elements R4, R3, R2, R1 among sensor elements detect the contact in order as an operation involving movement as shown in (b). In this case, since the contact transits three adjacent sensor elements from bottom to top, the operation target region moves upward by three items from the item LS4 to the item LS1 as shown in (c).

Similarly, when sensor elements are traced upward (clockwise) as indicated by an arrow A2 in FIG. 7(a), sensor elements L1, L2, L3, L4 among sensor elements detect the contact in order as an operation involving movement as shown in (b). In this case, since the contact transits three adjacent sensor elements from bottom to top like the arrow AR1, the operation target region moves upward by three items from the item LS4 to the item LS1 as shown in (c).

Figure 8:
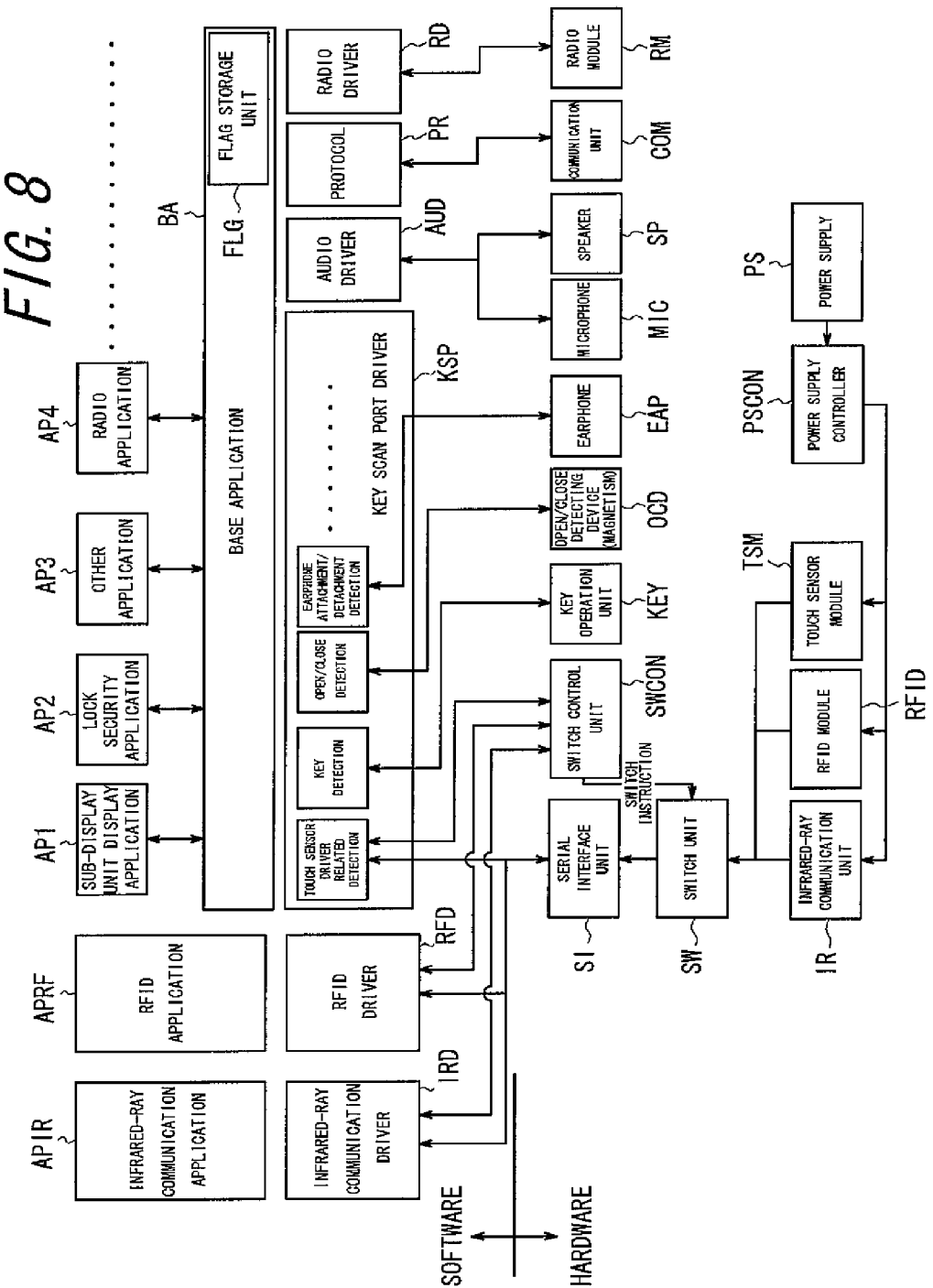
FIG. 8 is a detailed functional block diagram of the cellular phone terminal according to the present invention.

FIG. 8 is a detailed functional block diagram of the cellular phone terminal 100 according to the present invention. Various kinds of software shown in FIG. 8 are executed by the control unit 110 after a work area is provided on the storage unit 140, on the basis of the program stored in the storage unit 140. As shown, each function of the cellular phone terminal is divided into a software block and a hardware block. The software block includes a base application BA having a flag storage unit FLG, a sub-display unit display application AP1, a lock security application AP2, other applications AP3 and a radio application AP4. The software block also includes an infrared-ray communication application APIR and a FeliCa application APF. When these applications (application software) control various kinds of hardware of the hardware blocks, an infrared-ray communication driver IRD, a FeliCa driver FD, an audio driver AUD, a radio driver RD, and a protocol PR are used as drivers. For example, the audio driver AUD, the radio driver RD, and the protocol PR control the microphone MIC, the speaker SP, the communication unit COM, and the radio module RM. The software block further includes a key scan port driver KSP for monitoring and detecting operation conditions of the hardware, and performs detections related to a touch sensor driver, key detections, open/closed detections of the cellular phone terminal of a folded type, slide type or the like, attaching/detaching detections of an ear phone and the like.

The hardware block includes the key operation unit KEY having various buttons such as a dial key or tact switches SW1, SW2, an open/closed detecting device OCD for detecting opening/closing based on an operation state of the hinge or the like, the microphone MIC attached to the main body, the ear phone EAP which is attachable and detachable, the speaker SP, the communication unit COM, the radio module RM, the serial interface unit SI, and a switch control unit SWCON, and the like. The switch control unit SWCON selects one among the infrared-ray communication unit IR, the FeliCa module FM, and a touch sensor module TSM (which is formed as a module of the sensor unit 120 and necessary components on driving the sensor unit 120 such as an oscillation circuit or the like), according to a command from a corresponding block in software blocks, and switches the selection target hardware (IR, FM, TSM) so that the serial interface unit SI picks up the corresponding command. The power supply PS provides power to the selection target hardware (IR, FM, TSM) through the power supply controller PSCON.

Figure 9:
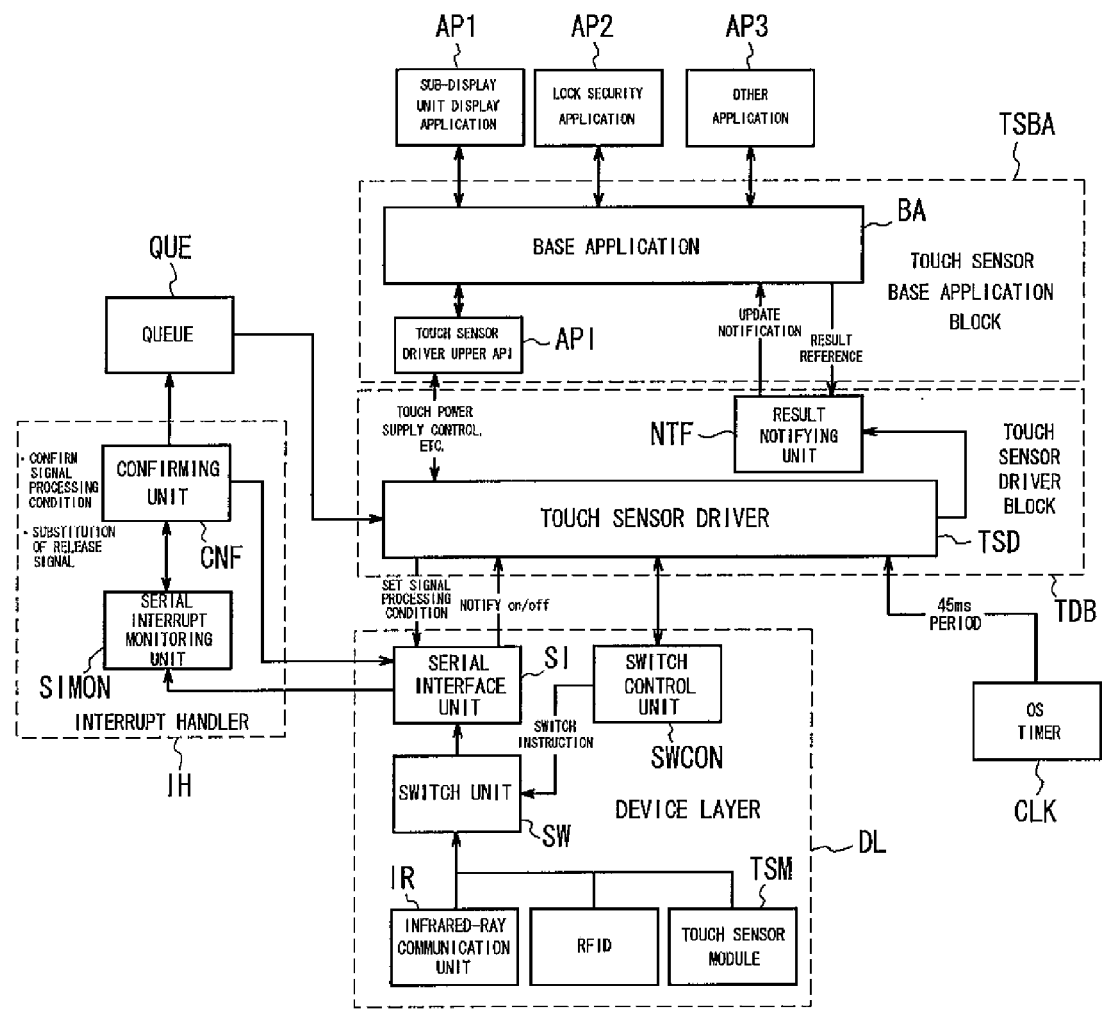
FIG. 9 is a detailed block diagram illustrating touch sensor functions of the cellular phone terminal according to the present invention.

FIG. 9 is a detailed block diagram illustrating touch sensor functions of the cellular phone terminal 100 according to the present invention. As shown, the cellular phone terminal 100 has a touch sensor driver block TDB, a touch sensor base application block TSBA, a device layer DL, an interrupt handler IH, a queue QUE, an OS timer CLK, and various applications AP1 to AP3. The touch sensor base application block TSBA has the base application BA and a touch sensor driver upper application interface API, and the touch sensor driver block TDB has a touch sensor driver (touch sensor control unit) TSD and a result notifying unit NTF. The device layer DL has the switch control unit SWCON, a switch unit SW, the serial interface unit SI, the infrared-ray communication unit IR, the FeliCa module FM and the touch sensor module TSM. The interrupt handler IH has a serial interrupt monitoring unit SIMON and a confirming unit CNF.

Next, function of each block will be described by referring to the drawing. In the touch sensor base application block TSBA, signals are exchanged between the base application BA and the touch sensor driver upper application interface API to decide whether or not to activate the touch sensor. The base application BA is a base application for the sub-display unit display application AP1 which is an application for the sub-display unit, the lock security application AP2 which is an application for locking the cellular phone terminal 100 for protecting security, and other applications AP3. The base application BA requests the touch sensor driver upper application interface API to activate the touch sensor when a request for activation of the touch sensor from above each application is performed. In the cellular phone terminal 100 according to this embodiment, the sub-display unit refers to the sub-display unit ELD indicated in drawings and provided on the central region of the sensor element groups arranged annularly.

When receiving a request for activation, the touch sensor driver upper application interface API confirms whether the touch sensor can be activated to a block (not shown) that manages activation of applications in the base application BA. Specifically, the touch sensor driver upper application interface API checks whether the sub-display unit ELD is lightened, which indicates that an application is being selected, or whether there is a flag indicating activation of an application for which the touch sensor is previously disabled, such as FM radio and other applications in the cellular phone terminal 100. As the result, when it is determined that the touch sensor can be activated, the touch sensor driver upper application interface API requests activation of the touch sensor module TSM to the touch sensor driver (touch sensor control unit) TSD. In other words, the power supply PS actually starts to provide power to the touch sensor module TSM through the power supply controller PSCON.

When there is a request for activation, the touch sensor driver TSD requests the serial interface unit SI in the device layer DL to open a port to the touch sensor driver TSD in the serial interface unit SI.

And then, under the control of the touch sensor driver TSD, a signal containing information of a sensing result by the touch sensor (hereinafter, it is referred to as contact signal) is outputted to the serial interface unit SI at the periods of 20 ms according to an internal clock of the touch sensor module TSM.

The contact signal is outputted as a signal having 8 bits corresponding to 8 sensor elements L1 to L4 and R1 to R4 described above, respectively. Specifically, when each sensor element detects a contact, a "flag:1" for indicating a contact detection is set to a bit corresponding to the sensor element which detects the contact, and a string of these bits forms the contact signal. In other words, the contact signal contains information indicating "which sensor elements are contacted or not contacted".

The serial interrupt monitoring unit SIMON in the interrupt handler IH extracts the contact signal outputted to the serial interface unit SI. In here, the confirming unit CNF confirms True/False of the extracted contact signal according to a predetermined condition in the serial interface unit SI, and inserts only TRUE signal into a queue QUE (classification of True/False of a signal will be described later). And, the serial interrupt monitoring unit SIMON monitors other interruptions of the serial interface unit SI during activating the touch sensor module TSM such as occurrence of pressing a tact switch.

In addition, the monitoring unit SIMON inserts a signal indicating "press" before a contact signal in the queue QUE (queuing), when a detected contact is the first contact. And then, the monitoring unit SIMON updates the contact signal at the periods of 40 ms according to an OS timer CLK in the operation system, and inserts a signal indicating "release" into the queue QUE when a predetermined number of contacts are not detected. In this way, it is possible to monitor a movement of contact detection in sensor elements from the start of contact to the release. The "first contact" means a state that there is no data in the queue QUE, or a phenomenon that a signal having a "flag:1" occurs when the nearest input data is the "release". By these processes, the touch sensor driver TSD can recognize detection states of sensor elements in a period from "press" to "release".

At the same time, when the contact signal which is output from the touch sensor satisfies the condition to be False, the monitoring unit SIMON preliminarily generates a signal indicating "release", and inputs it into the queue QUE. Here, as the conditions to be False, "when a contact is detected by two discontinuous sensor elements", "when an interrupt occurs during activating the touch sensor (for example, when a lighting on/off state of the sub-display unit ELD is changed by notification of the arrival of a mail or the like)", "when push-down of the key occurs during activating the touch sensor", "contact across a plurality of sensor element groups is detected" as will be described later, or the like is set.

Further, for example, when two adjacent sensor elements such as the sensor to elements R2 and R3 detect a contact at the same time, the monitoring unit SIMON inserts the contact signal in which flags are set to the bits corresponding to the elements which detect the contact into the queue QUE as the case that a single element detects a contact.

The touch sensor driver TSD reads out the contact signal from the queue QUE at the periods of 45 ms, and determines the elements that detect the contact based on the read contact signals. The touch sensor driver TSD determines "a contact start element", "detection of a moving direction (clockwise/counterclockwise) of the contact" and "a moving distance from press to release" by considering a change of the contact determined by the contact signals which are read in sequence from the queue QUE, and the positional relationship with the detected elements. The touch sensor driver TSD provides the determined result to the result notifying unit NIF, and notifies the base application BA that the result should be updated.

The moving direction and moving distance of a contact are determined by combination of detection of the adjacent sensor elements and detection of each of the sensor elements, and various methods (determination rules) can be applied to this. For example, when a contact transits from a certain sensor element (for example, R2) to the adjacent sensor element (R3 in the case of this example), it is determined that a movement by an amount of one element (amount of one item of selection candidate item on the sub-display unit) in the direction.

As described above, when update of the result is notified to the base application BA by the touch sensor driver TSD, the base application BA confirms the result notifying unit NTF, and notifies the applications which are higher applications and require the touch sensor result (the sub-display unit display application AP1 for menu screen display on the sub-display unit, the lock security application AP2 for lock control, and the like) of the content of the information notified to the result notifying unit NTF.

A power ON/OFF control for the touch sensor module TSM when using the touch sensor unit 210 (touch sensors) will now be described. When the touch sensor driver TSD (control unit, calibration unit) detects an activation permission request (a first request) of the touch sensor module TSM in a no-voltage applied state (an operation disable state) where voltage is not applied to the touch sensor module TSM, the touch sensor driver TSD raises the voltage applied to the touch sensor module TSM to a predetermined voltage level in order to drive the touch sensor module TSM, and switches the touch sensor module TSM to an ON state (an operation enable state) after performing predetermined calibration. In other words, the touch sensor module TSM is designed to be switchable between the ON state and the OFF state. When the touch sensor driver TSD detects an activation prohibition request (a second request) of the touch sensor module TSM in the ON state where the predetermined voltage is applied, the touch sensor driver TSD lowers the voltage and switches the touch sensor module TSM to the OFF state, which is the no-voltage applied state. However, when detecting an activation permission request of the touch sensor module TSM during lowering the voltage, the touch sensor driver TSD tries to raise the voltage again to the predetermined voltage level at the point of time when the activation permission is request and the touch sensor module TSM is in a voltage applied state (a state in which the voltage is not completely lowered to the no-voltage applied state). However, the touch sensor module TSM is designed to detect an operation to the panel PNL normally only after voltage is raised to a predetermined voltage level from the no-voltage applied state, which is an initialized state, and the predetermined calibration is performed. Accordingly, if the touch sensor driver TSD raises the voltage to the predetermined voltage level at the state where the voltage is not completely lowered to the no-voltage applied state as described above, the calibration is not performed normally, and therefore, the touch sensor module TSM can not detect an operation on the panel PNL correctly.

Therefore, the touch sensor driver TSD suppresses the voltage application and calibration according to an activation permission request when the activation permission request of the touch sensor module TSM is detected during lowering the voltage, and gives priority to control of the switching operation to the OFF state. Thus, it is possible to prevent the touch sensor module TSM from being in a state where it cannot detect an operation to the panel PNL correctly. And, the touch sensor driver TSD satisfies the activation permission request of the touch sensor module TSM by raising voltage to a predetermined voltage level to drive the touch sensor module TSM and performing the predetermined calibration after switching the touch sensor module TSM to the OFF state, which is the no-voltage applied state. In here, the calibration is an operation for measuring a reference capacitance of the sensor element and performed by the touch sensor driver TSD (Since the capacitance-type sensor element detects an operation state based on changes of the reference capacitance, it is necessary to have the reference capacitance when using it).

There may be an activation permission request just after an activation prohibition request of the touch sensor module TSM, for example, in case a user closes the housing just after opening it, in case a user turns off an FM radio just after turning it on, in case a user lights the sub-display unit ELD just after putting it out, in case an UART (a communication circuit of the serial port) is switched to the touch sensor module TSM just after being switched to the infrared-ray communication unit IR or the FeliCa, or the like.

The case in which a user closes the housing just after opening it means that the power of the touch sensor module TSM is turned off since an operation will be performed at the side of the display unit 130 in the open state, and just thereafter, the housing is open and the power is turned on in order to make it possible to do operations on the touch sensor module TSM. In this case, the key scan port driver KSP (open/closed detection unit) monitors the open/closed detecting device OCD, and requests activation permission or activation prohibition of the touch sensor module TSM to the touch sensor driver TSD by detecting the open/closed state of the housing.

The case in which a user turns off the FM radio just after turning it on means that the power of the touch sensor module TSM is turned OFF since the radio is turned on, and just thereafter, the FM radio is turned off and the power of the touch sensor module TSM is turned ON. Specifically, the touch sensor module TSM of the cellular phone terminal 100 has an oscillation circuit and an electrode connected to the oscillation circuit, and is designed to detect a contact operation based on changes of frequency or amplitude of an oscillated signal outputted from the oscillation circuit and changed by the contact operation to the electrode. Therefore, in case the oscillation frequency of the oscillation circuit has a value close to a reception frequency of the FM radio, a noise is inserted to the radio if a user operates the touch sensor module TSM in the ON state of the FM radio, and therefore, the ON state of the FM radio is established not to coexist with the power ON state of the touch sensor module TSM. In this case, the radio application AP4 requests activation permission or activation prohibition of the touch sensor module TSM to the touch sensor driver TSD through the base application BA and the touch sensor driver upper application interface API.

The case in which a user lights the sub-display unit ELD just after putting it out means that since the lighting on/off of the sub-display unit is interlocked with the power ON/OFF of the touch sensor module TSM, the power of the touch sensor module TSM is turned OFF since the sub-display unit ELD is put out, and just thereafter, the sub-display unit ELD is lightened and the power of the touch sensor module TSM is turned ON. In this case, the sub-display unit display application AP1 requests activation permission or activation prohibition of the touch sensor module TSM to the touch sensor driver TSD through the base application BA and the touch sensor driver upper application interface API.

The case in which the UART is switched to the touch sensor module TSM just after being switched to the infrared-ray communication unit IR or the FeliCa means that the power of the touch sensor module TSM is turned OFF since the UART is switched to the infrared-ray communication unit IR or the FeliCa from the touch sensor module TSM, and just thereafter, the UART is switched to the touch sensor module TSM from the infrared-ray communication unit IR or the FeliCa by terminating the infrared-ray communication unit IR or the FeliCa, and the power of the touch sensor module TSM is turned ON. In the present cellular phone terminal 100, the infrared-ray communication unit IR, the FeliCa module FM, and the touch sensor module TSM are connected to the UART, and generally, a serial port of the touch sensor module TSM is open. However, since serial ports cannot be open simultaneously, they are configured to be switched by the switch unit SW. Therefore, when the infrared-ray communication application APIR or the FeliCa application APF requests activation permission of the infrared-ray communication unit IR or the FeliCa module FM to the touch sensor driver TSD through the infrared-ray communication driver IRD or the FeliCa driver FD, the switch control unit SWCON switches to the infrared-ray communication unit IR or the FeliCa module FM with the switch unit SW.

Figure 10:
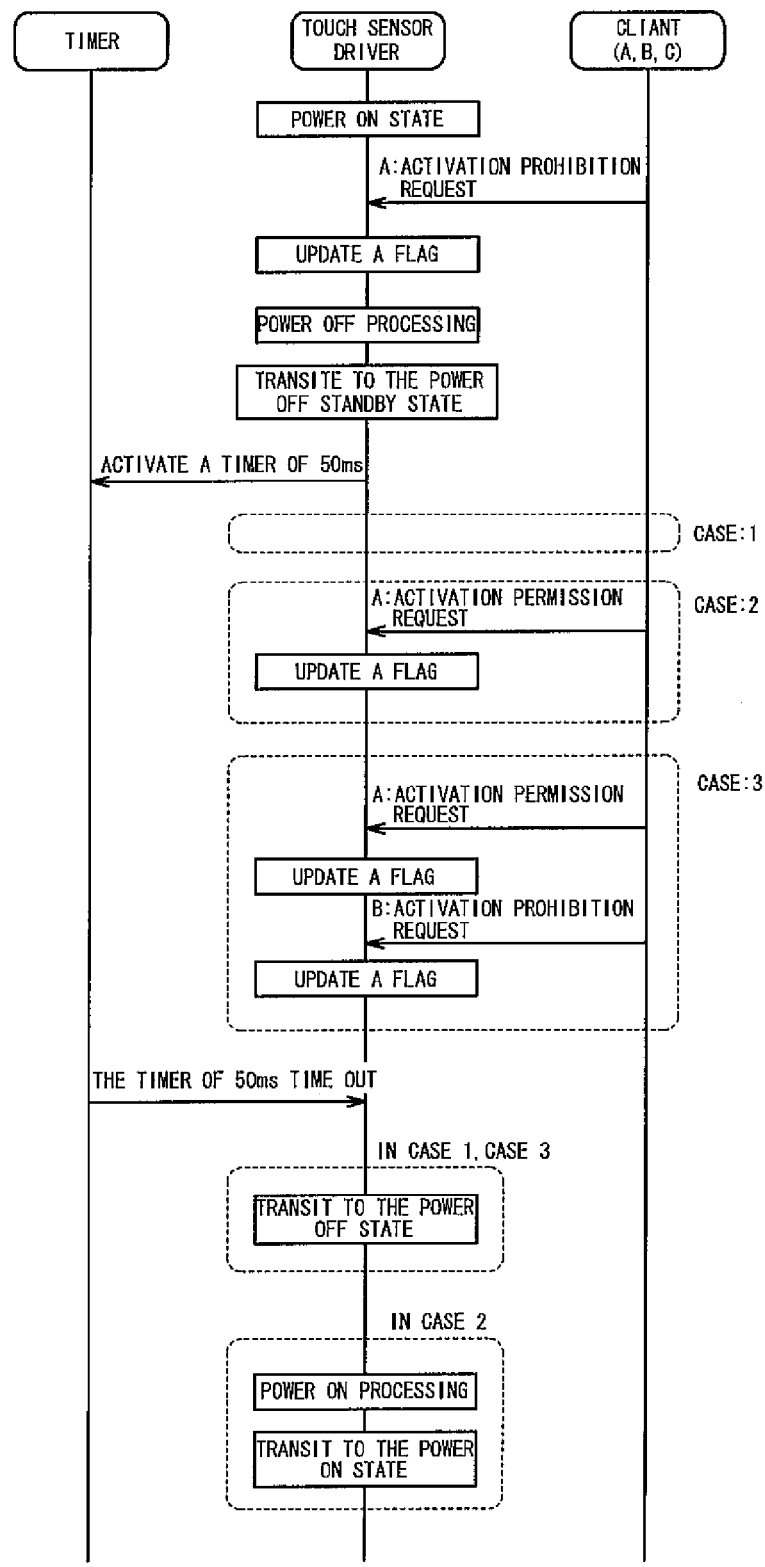
FIG. 10 is a sequence diagram illustration a power ON/OFF control of a touch sensor module TSM.

FIG. 10 is a sequence diagram illustrating the power ON/OFF control of the touch sensor module TSM. A processing unit for performing the power ON/OFF control of the touch sensor module TSM is the touch sensor driver (touch sensor control unit) TSD. In other words, the touch sensor driver TSD performs the power ON/OFF control of the touch sensor module TSM through the power supply controller PSCON. In here, the key scan port driver KSP for detecting the open/closed state of the housing, the radio application AP4, the sub-display unit display application AP1 are referred to as clients, and it is assumed that there are A, B and C as clients. And the touch sensor driver TSD uses a timer to perform standby of 50 ms, which is the time until voltage of the touch sensor module TSM falls down sufficiently.

When the client A performs an activation prohibition request of the touch sensor module TSM in the power ON state of the touch sensor module TSM, the touch sensor driver TSD updates a permission/prohibition flag in the flag storage unit FLG (storage unit) of the base application BA to the prohibition flag, and performs a power OFF process. At this time, since the touch sensor module TSM cannot transit to the power OFF state (a state in which the power is completely turned off) immediately, the touch sensor driver TSD transits to the power OFF standby state, and activates the timer of 50 ms in order to perform standby of 50 ms. When there is an activation permission/prohibition request of the touch sensor module TSM from each client before the timer has timed out, an actual process is not performed, and only the permission/prohibition flag is updated. The sequence diagram shows three cases as typical cases. The case 1 indicates a case in which there is no activation permission/prohibition request from other clients; the case 2 indicates a case in which a client who requested activation prohibition requests activation permission; and the case 3 indicates a case in which another client requests activation prohibition while a client who requested activation prohibition requests activation permission. The three cases are described as exemplary, and the present invention can be applied to other cases. For example, the flag may be updated three times or more.

When the timer has timed out, the touch sensor driver TSD refers to the permission/prohibition flag, determines the power OFF state in case 1 and case 3 because the flag stored lastly is the prohibition flag, and switches the touch sensor module TSM to the power OFF state. In case 2, since all clients request permission, the touch sensor driver TSD performs the power ON process again, and the touch sensor module TSM becomes the power ON state.

As shown in FIG. 10, the flag storage unit FLG for storing a flag indicating that there is an activation permission request or an activation prohibition request during the power OFF standby state is further included, and the touch sensor driver TSD satisfies the activation permission request or the activation prohibition request of the touch sensor module TSM by performing control based on the flag lastly stored in the flag storage unit FLG after the touch sensor module TSM transits to the power OFF state.

In addition, the touch sensor driver TSD controls the switching operation to the power OFF state when there is an activation prohibition request of the touch sensor module TSM in the power ON state of the touch sensor module TSM or during switching to the ON state from the OFF state. When there is an activation prohibition request during the power ON state, the touch sensor driver TSD controls the power OFF process of the touch sensor module TSM immediately since there is no calibration problem, so that operability is improved. It is especially effective in case that the activation prohibition request of the touch sensor module TSM is an operation for turning on the FM radio, because it is possible to prevent noise from being inserted into the radio immediately.

While the invention has been described with reference to exemplary embodiments and drawings, it will be understood by those skilled in the art that many various modifications and extensions may be implemented using the teaching of this invention. All such modifications and extensions are intended to be included within the true spirit and scope of the present invention. For example, each member, each means, function included in each step and the like can be rearranged not to be contradictory logically. And, a plurality of unit, steps and the like can be combined or divided. For example, in embodiments described above, a layout of sensor elements provided annularly is described, but sensor element groups can be arranged in a U shape symmetrically with a display unit placed between them. In addition, in above embodiments, sensor element groups are arranged on left and right sides of the display unit, but they may be arranged on top and bottom of the display unit. Moreover, above embodiments are exemplarily described with a cellular phone terminal, but the present invention can be widely applied to portable electronic apparatus such as portable wireless terminal, PDA (personal digital assistant), portable game devices, portable audio player, portable video player, portable electronic dictionary, portable electronic book viewer or the like. There are some kinds of contact sensors that need to use an instruction device such as a dedicated pen or the like except for a finger, and the present invention may be applied to a portable electronic apparatus having such a contact sensor.

Moreover, while the present embodiment is configured so as to suppress the setting to the ON state and the calibration according to an activation permission request performed when the touch sensor module TSM is being switched to the OFF state from the ON state, the present invention is not limited thereto and, for example, can be configured so as to suppress the setting to the ON state and the calibration according to an activation permission request performed when the touch sensor module TSM is being switched to the ON state from the OFF state. In other words, if the setting to the ON state and the calibration is started again according to an activation permission request when the touch sensor module TSM is being switched to the ON state from the OFF state, the calibration for the touch sensor module TSM is not performed properly although it becomes the ON state, and as the result, the touch sensor module TSM cannot detect an operation correctly. However, the present invention employs the configuration which suppresses the setting to the ON state and the calibration according to an activation permission request performed when the touch sensor module TSM is being switched to the ON state from the OFF state, and therefore, it is possible to prevent a detection error of an operation because the calibration is not performed properly.

In addition, in the present embodiment, the activation prohibition request for the touch sensor module TSM is described, for example, as a detection result of the key scan port driver KSP based on movement of the housing from the closed state to the open state, and the activation permission request is described, for example, as a detection result of the key scan port driver KSP based on movement of the housing from the open state to the closed state. However, the present invention is not limited to the embodiment, and for example, the activation prohibition request for the touch sensor module TSM may be the detection result of the key scan port driver KSP based on movement of the housing from the open state to the closed state, and the activation permission request may be the detection result of the key scan port driver KSP based on movement of the housing from the closed state to the open state. In this case, when the touch sensor module TSM is arranged on a region adjacent to the display unit 130 so that the touch sensor module TSM can be operated in the open state of the housing, the touch sensor module TSM appears on the region where it is easily operated when the housing is moved to the open state from the closed state. Moreover, since the activation permission is requested according to detection of the key scan port driver KSP based on the movement, the calibration is performed and the touch sensor module TSM is set to the ON state. Therefore, it is possible to improve operability.

The invention claimed is:

1. An electronic apparatus comprising:
an operation unit;
an operation detection unit detecting an operation to the operation unit and switchable between an operation enable state (ON state) and an operation disable state (OFF state);
a calibration unit for performing calibration on the operation detection unit; and
a control unit for setting the operation detection unit to the operation enable state and controlling the calibration unit to perform calibration on the operation detection unit according to a first request,
wherein the operation detection unit can correctly detect an operation to the operation unit when the setting to the operation enable state by the control unit and the calibration by the calibration unit are performed according to the first request in the operation disable state, and
the control unit suppresses the setting to the operation enable state of the operation detection unit and the calibration by the calibration unit according to the first request performed during setting the operation detection unit to the operation disable state from the operation enable state.

2. The electronic apparatus according to claim 1, wherein the control unit sets the operation detection unit to the operation enable state and controls the calibration unit to perform calibration according to the first request performed during setting the operation detection unit to the operation disable state from the operation enable state, after the operation detection unit is set to the operation disable sate.

3. An electronic apparatus comprising:
an operation unit;
an operation detection unit detecting an operation to the operation unit and switchable between an operation enable state (ON state) and an operation disable state (OFF state);
a calibration unit for performing calibration on the operation detection unit; and
a control unit for setting the operation detection unit to the operation enable state and controlling the calibration unit to perform calibration on the operation detection unit according to a first request,
wherein the operation detection unit can correctly detect an operation to the operation unit when the setting to the operation enable state by the control unit and the calibration by the calibration unit are performed according to the first request in the operation disable state, and
the control unit suppresses the setting to the operation enable state of the operation detection unit and the calibration by the calibration unit according to the first request performed during setting the operation detection unit to the operation enable state from the operation disable state.

4. The electronic apparatus according to claim 1,
further comprising a storage unit for storing that the first request or a second request is performed during setting the operation detection unit to the operation disable state from the operation enable state,
wherein the control unit sets the operation detection unit to the operation disable state according to the second request, sets the operation detection unit to the operation enable state and controls the calibration unit to perform calibration according to the first request when a request lastly stored in the storage unit during setting the operation detection unit to the operation disable state from the operation enable state is the first request, and sets the operation detection unit to the operation disable state when the request lastly stored in the storage unit during the setting is the second request.

5. The electronic apparatus according to claim 4, further comprising:
a first housing;
a second housing;
a connection unit for connecting the first housing and the second housing in an openable and closable manner; and
an open/closed detection unit for detecting an open/closed state of the first housing and the second housing through the connection unit,
wherein the control unit recognizes a detection result of either one of open and closed states of the first housing and the second housing detected by the open/dosed detection unit as the first request, and recognizes a detection result of the other state as the second request.

6. The electronic apparatus according to claim 1 or claim 3, further comprising:
a first housing;
a second housing;

a connection unit for connecting the first housing and the second housing in an openable and closable manner; and an open/closed detection unit for detecting an open/closed state of the first housing and the second housing through the connection unit, wherein the control unit recognizes a detection result of the open/closed state of the first housing and the second housing detected by the open/closed detection unit as the first request, and then sets the operation detection unit to the operation enable state and controls the calibration unit to perform calibration on the operation detection unit.

7. The electronic apparatus according to claim 3, wherein the control unit switches the operation detection unit to the operation disable state when there is a second request during setting the operation detection unit to the operation enable state from the operation disable state.

8. A control method for an electronic apparatus having an operation detection unit detecting an operation to an operation unit and switchable between an operation enable state (ON state) and an operation disable state (OFF state), and detecting an operation to the operation unit correctly when a setting to the operation enable state and a calibration are performed according to a first request performed in the operation disable state, the control method comprising:

suppressing the setting to the operation enable state of the operation detection unit and the calibration according to the first request performed during the operation detection unit is being switched between the operation enable state and the operation disable state.

* * * * *